March 5, 1957  J. LUDERS  2,783,487
CARPET SWEEPERS
Filed Feb. 2, 1953
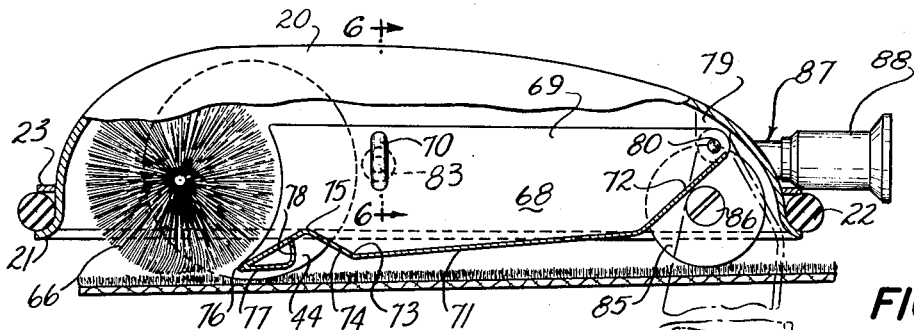
FIG. 1
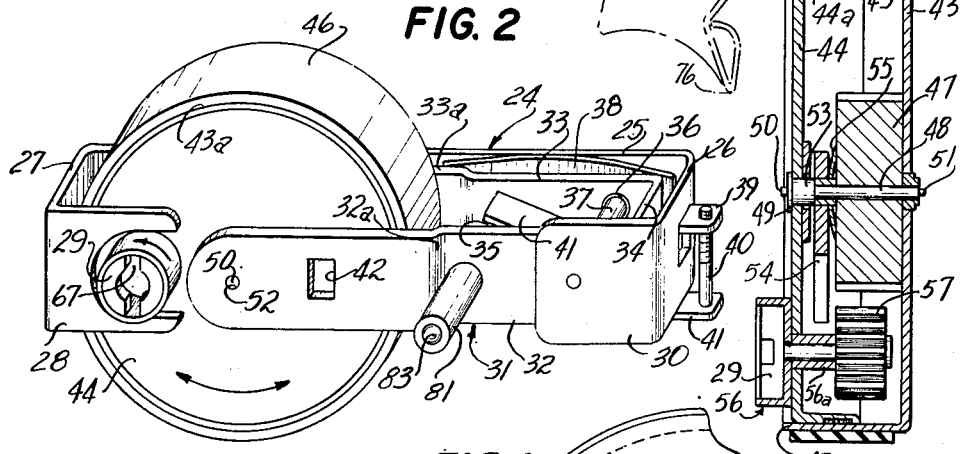
FIG. 2
FIG. 5
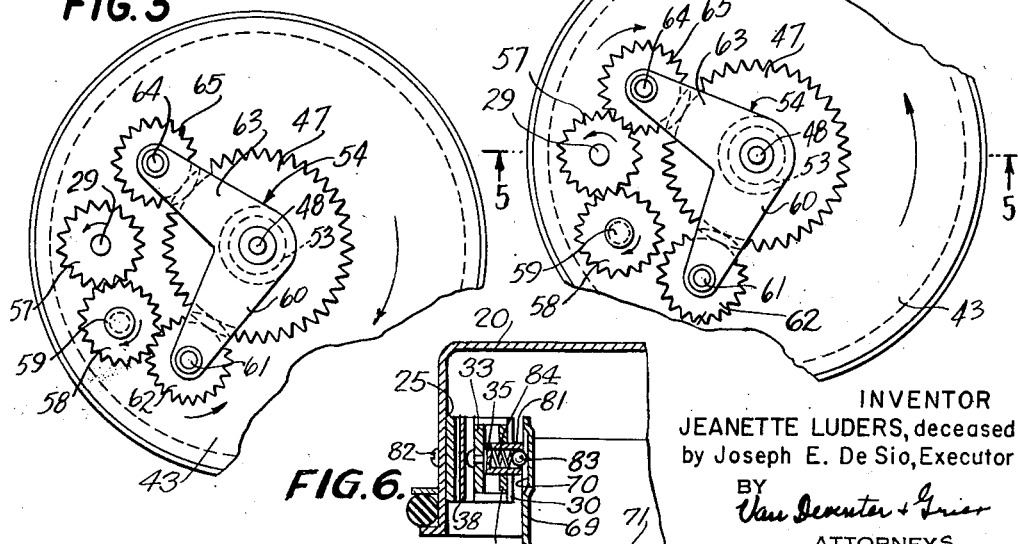
FIG. 3
FIG. 4
FIG. 6
INVENTOR
JEANETTE LUDERS, deceased
by Joseph E. De Sio, Executor
BY
*Van Deventer + Grier*
ATTORNEYS

United States Patent Office 2,783,487
Patented Mar. 5, 1957

2,783,487

CARPET SWEEPERS

Jeanette Luders, deceased, late of Kew Gardens, N. Y., by Joseph E. De Sio, executor, Queens, N. Y., assignor to Lloyd Luders and Margaret Luders, New York, N. Y.

Application February 2, 1953, Serial No. 334,484

5 Claims. (Cl. 15—41)

This invention relates to improvements in carpet sweepers for use on floors, carpets, rugs and the like, and has for an object the provision, in a carpet sweeper, of a dust pan which, under the influence of gravity, follows the contours of the surface being swept, or cleaned.

Another object of the invention is the provision in a carpet sweeper of a casing, a dust pan and a rotary brush which rotates toward the dust pan regardless of whether the device is moved forwardly or rearwardly, means being provided between the brush and the traction wheels for producing this effect.

A further object of the invention is the provision, in a carpet sweeper, or the like, of a dust pan pivotally supported in the main casing, said dust pan having oppositely disposed elongated depressions engaged by yieldable means fixed within the casing which engage the sides of the dust pan and permit it to move upwardly and downwardly within predetermined limits and thereby follow the contours of the surfaces being cleaned, said dust pan being adapted to be manually disengaged from said means and swung downwardly to discharge the contents therefrom.

Still another object of the invention is the provision of a sweeper having a casing, a brush in said casing adapted to rotate in the same direction as before regardless of the movement of the device, a dust pan having an open mouth spanned by said brush, a lip formed on said mouth adapted to follow the contour of a surface traversed by said sweeper, and means partly on said casing and partly on said dust pan defining the up and down movement of said dust pan.

Other objects of the invention will be apparent to those skilled in the art upon a study of the following specification, and the accompanying drawings.

In the drawings, which are merely given by way of example to illustrate the invention:

Figure 1 is a side elevation partly in section showing details of one form of the invention;

Figure 2 is a perspective view of one of my new and improved traction units (of which one right hand and one left hand form is employed in each cleaning device);

Figure 3 is a view partly in section of the reversing gearing showing the pinion for driving the brush moving in the opposite direction as the movement of the traction wheel;

Figure 4 is similar to Figure 3, except that the gearing is shifted by the reverse direction of the traction wheel, and the brush pinion rotates the same direction as before although the traction wheel rotates in the opposite direction;

Figure 5 is a sectional elevation of the traction wheel taken along line 5—5 of Figure 4, some parts having been omitted for the sake of clarity; and Figure 6 is a fragmentary view taken along the lines 6—6 of Figure 1, showing rigid means on the casing for resiliently engaging the dust pan.

Referring first to Figure 1, the cleaning device includes a main casing 20. This casing is in the form of a solid back inverted rectangular vessel.

The lower edge 21 of the casing is flared outwardly to accommodate a surrounding strip of rubber or other cushion-like material, 22. At intervals, adjacent to the strip 22, are provided projections 23 which are spaced apart from the flare 21 a distance sufficient to snugly hold the cushion 22.

Within the casing 20 are mounted a right hand and a left hand traction unit such as is shown in perspective in Figure 2. The traction units each include a frame member generally designated by the numeral 24, and having an elongated side with end portions 26 and 27 formed integral therewith.

The portion 27 has integral therewith a bifurcated portion 28 the legs of which straddle the brush-rotating shaft 29. The portion 26 has integral therewith a portion 30 which is in alignment with the portion 28.

A U-shaped member 31 has parallel legs 32 and 33 joined by a portion 34 parallel to the end 26. The leg 32 is offset outwardly at 32a, and likewise the leg 33 is offset outwardly at 33a. This member is herein termed "a subframe."

Extending through the legs 32 and 33, and forming a rigid support is a stud 35 which has a projecting portion 81. Adjacent to the end 34 are aligned holes, one of which may be seen at 36, and a stud 37 secured to the portions 25 and 30 forms a pivotal support for the yoke or subframe 31. A spring 38 between the leg 33 and the side 25 urges the yoke in a direction to cause the surface of the leg 32 to bear against the inner surface of the portion 30.

Struck out from the end 26 is an ear 39 which has a threaded hole formed therein and engaged by the threads of a screw 40 which passes through the end of a spring 41. The spring 41 engages the stud 35 and fulcrums against the lower surface of the end portion 26 tending to urge the subframe 31 in a counter-clockwise direction, as seen in Figure 2.

Formed in the offset portions 32a and 33a, are aligned rectangular holes 42. One of these holes may be seen in the leg 32a, and the other one is identical therewith and in alignment therewith and is engaged by a stud, not shown, extending inwardly from the side 25, of the frame 24 for limiting the movement of the V-shaped member 31 relative to the frame 24.

The traction wheel, referring to Figure 5, includes a cup-shaped member 43 and a cooperating cup-shaped member 44. The flange 44a, of the cup 44 fits inside the flange 43a, of the cup-shaped member 43, and an annular ring 45, of felt or the like, mounted on the flange 44a, forms a grease seal therebetween.

On the outer surface of the flange 43a is carried a tire 46, formed of rubber or the like. Centrally located in the cup 43, is a gear 47, which has a central hole reamed out and journaled on the stud shaft 48. The gear 47 is fixed to and moves with the cup-shaped member 43. The stud shaft 48 is rigidly mounted in the cup-shaped member 44, and has a boss portion 49 and a shaft 50 extending therefrom. A shaft 48 has a portion 51 of reduced diameter, and the projecting shafts 50 and 51 are journaled in aligned holes 52 formed in the yoke legs 32a and 33a, Figure 2.

Within the cup shaped member 44, the shaft 48 terminates on a shoulder 53 against which a swinging yoke 54 (to be presently described in connection with Figures 3 and 4), bears under the urge of a cupped spring washer 55. Also fixed in the cup shaped member 44 is a stepped unitary bushing 56, the outer end of which forms a socket for the brush rotating shaft 29, and the inner end 56a of which forms a shoulder against which the brush rotating pinion 57 bears.

The pinion 57, as may be seen in Figures 3 and 4, meshes with an idler pinion 58 which is journaled on a stud shaft 59 mounted in the cup shaped member 44 spaced apart from and parallel to the shaft 29.

The swinging yoke 54 has a hole therein which is journaled on the shaft 48 and is forced against the shoulder 53 by means of the cupped spring washer 55. The swinging yoke has an arm 60 which carries a stud shaft 61 on which is journaled a pinion 62, and a second arm 63 which carries a stud shaft 64 upon which is journaled a pinion 65. Both the pinion 62 and the pinion 65 mesh with the gear 47 at all times.

When the cup shaped member 43 of the traction wheel is rotated in a clockwise direction, as seen in Figure 3, the frictional urge of the pinions 62 and 65 meshed with the gear 47, plus the frictional urge of the spring washer 55, causes the pivoted yoke member to also move in a clockwise direction, thereby bringing the pinion 62 into meshed engagement with the pinion 58, which is meshed with the brush driving pinion 57 with the result that the brush driving shaft 29 is rotated in a counter-clockwise direction due to the fact that the gear 47, rotating clockwise, rotates the pinion 62 counter-clockwise, and this pinion in turn rotates the pinion 58 clockwise, therefore the pinion 57 meshing therewith is rotated in a counter-clockwise direction.

Now, when the cup shaped member 43 is rotated in a counter-clockwise direction, as seen in Figure 4, the pivoted yoke 54 is likewise moved by friction in a counter-clockwise direction, thereby removing the pinion 62 from engagement with the pinion 58 and bringing the pinion 65 into meshed engagement with the pinion 57. This causes the brush driving pinion 57 to rotate in a counter-clockwise direction which may be traced as follows: The gear 47 moving in a counter-clockwise direction drives the pinion 65 clockwise, the pinion 65 drives the pinion 57 counter-clockwise, and consequently the brush, which is driven by the pinion 57, rotates in a counter-clockwise direction.

From the above description it will be seen that by a simple gearing arrangement, I drive my brush in the same direction regardless of whether the carpet sweeper is propelled forwardly or rearwardly.

Referring now to Figures 1 and 2, a brush 66 has the ends of its shaft shaped to fit the keyholes 67 formed in the brush driving shaft 29, and since two brush driving or traction units are mounted in the casing 20, one right hand and one left hand unit, the ends of the shaft of the brush 66 are supported by the oppositely disposed shafts 29, and as seen in Figure 1, the brush 66 will always rotate in a counter-clockwise direction. The traction units are secured in the casing 20 by means of screws 82 (Figure 6).

The dust pan 68 has end plates, one of which is shown at 69, with elongated depressions 70, formed therein. Between the end plates 69 is a bottom plate 71, the rear end 72 of which is angular with respect to the main portion 71. Formed in the portion 71 is a depression 73, the wall 74 of which is inclined upwardly to an apex 75. From the apex 75 the wall is inclined downwardly and bent back upon itself to form a peak 76. The portion 77 extending rearwardly from the peak 76 is bent at substantially a right angle and designated by the numeral 78 so as to abut the lower surface of the inclined portion between the apex 75 and the point 76.

Within the casing 10 are lugs, one of which is shown at 79, and these lugs have aligned holes formed therein adapted to be engaged by stud shafts or pivots 80, carried by the side walls 69 of the dust pan. The means for retaining the dust pan in operative position is shown in Figure 6, and will now be described in detail. The stud 35 as stated above is provided with an end portion 81, and this portion is drilled out to accommodate a spring 84 and a steel ball 83. After the spring and the ball are positioned in the stud 81, the end of the stud is spun so as to restrain the ball 83 therein, thus a portion of the ball projects from the end of the stud 81. This retaining means may be termed "opposed spring-loaded engageable means." The ball 83 is adapted to engage and normally lie in contact with the depressions 70 formed in the ends 69 of the dust pan. Due to the fact that the depression 70 is elongated, and due to the fact that the ball 83 only lightly engages the surface of the depression 70, the dust pan will normally follow the contour of the surface being cleaned, due to the fact that it is urged downwardly by gravity. When the sweeper is used on rugs the point 76 would be higher than if the sweeper is used on a plain or a linoleum covered floor. By this arrangement my new and improved cleaner sweeps all of the dirt into the dust pan instead of throwing some of it underneath the pan on the floor, as is the case with many carpet sweepers now on the market.

When it is desired to empty the dust pan 68, the user takes hold of the edge of the tray adjacent to the brush, Figure 1, and swings it downwardly to the position shown in dot-dash lines while holding the sweeper in an elevated position. Due to the flexibility of the sides 69 the depressions 70 are disengaged from the balls 83 and the dust pan may then swing downwardly on the pivots 80 to assume the vertical position, shown in dot-dash lines in Figure 1. When in this position all of the dust falls out upon a paper, or in a vessel as the case may be, due to the fact that the inner surface of the dust pan has no sharp corners in which dust may be held or accumulated.

The carpet sweeper of Figure 1, normally has the dust pan just clearing the surface it traverses. In use, however, the pressure exerted upon the handle (not shown) is transmitted to the sweeper via the socket 88 and the yoke member 87 and thence to the body 20. This pressure, reacting against the spring 41 causes the case 20 and the dust pan 68 carried thereby to move downwardly to a point where the portion 77 of the dust pan skims or lightly engages the surface being cleaned, as the cleaner is moved along. This is an important feature of the sweeper, which is conducive to its sweeping cleaner than any other carpet sweeper of the prior art.

Positioned near the rear end of the casing 20 is a pair of rollers 85 which are journaled on shouldered screws 86. A yoke member 87' has arms oppositely engaging the side of the sweeper pivotally, and intermediate thereof is a socket 88 adapted to be engaged by a detachable handle, not shown.

Although I have herein shown and described by way of example, an embodiment of my new and improved cleaning device, it is obvious that many changes may be made in the arrangements shown and described without departing from the spirit of the invention as set forth in the following claims.

What is claimed is:

1. In a carpet sweeper, in combination, a casing having a pair of traction wheels journaled therein, a brush rotatably supported in said casing, drive means operatively connecting said wheels to said brush, a dust pan comprised of a floor portion having at least two opposite side walls with aligned vertically disposed elongated depressions formed therein, said dust pan having an open receiving end and a closed end, means pivotally supporting said closed end of said pan within said casing at a point remote from said brush, said floor portion having a portion offset upwardly and down again adjacent to said receiving end to facilitate the entrance of dust and dirt into said pan and to retain the same therein, and opposed restrained spring loaded pan engageable means within said casing lightly engaging said elongated depressions and thereby permitting an up and down movement of said receiving end of the pan as the same traverses the contour of a surface being cleaned, said pan being adapted to be swung to an emptying position by displacing said pan engageable means without the use of tools.

2. In a sweeper, in combination, a casing having a pair of traction wheels journaled therein, a brush rotatably supported within the front end of said casing, drive means between said wheels and said brush for rotating the latter in one direction only, regardless of the direction in which the sweeper is moved, a dust pan comprised of a floor portion having at least two opposite side walls with aligned vertically disposed elongated depressions formed therein, said dust pan having an open receiving end and a closed end, means pivotally supporting said last end of said pan within said casing at a point remote from said brush, said floor portion at said open end having a threshold which slants upwardly then down again to join said floor portion, said threshold being provided to facilitate the entrance of dust and dirt into said pan and to retain the same therein, the lower extremity of said threshold having a portion thereof folded under said floor portion so that it approaches parallelism with a surface being cleaned and thus prevents any tendency of said extremity to dig into said surface, and opposed resilient means within said casing lightly engaging said elongated depressions and thereby permitting an up and down movement of said receiving end as the same traverses a surface being cleaned.

3. The invention according to claim 1 in which said opposed restrained spring loaded pan engageable means is comprised of a pair of tubular studs extending toward each other within said casing and each having a spring loaded ball therein, said balls being adapted to lightly engage and cooperate with said elongated depressions for permitting the dust pan to follow the surface.

4. In a sweeper, a casing, a brush rotatably carried in said casing adjacent to one end thereof, means to rotate said brush, a dust pan having a receiving end adjacent to said brush and having its other end pivotally supported near the opposite end of said casing, said dust pan including vertical sides having elongated vertical depressions oppositely disposed therein, and stud means mounted in opposite sides of said casing and having spring loaded balls therein adapted to engage said elongated depressions, said dust pan being adapted to be disengaged from said resilient means and swung downwardly on its pivots when it is desired to empty the same, said elongated depressions being adapted to define a predetermined free path of movement of said pan under the urge of gravity, whereby the receiving end of said pan may follow the contours of the surface being cleaned.

5. In a sweeper, in combination, a generally rectangular casing having a pair of subframes each having a traction wheel journaled therein near the front end of said casing, spring means urging said casing upwardly and said subframe downwardly, a brush rotatably supported in said casing and operatively connected to said wheels, a pair of free rollers journaled in said casing near the rear end thereof, a dust pan positioned in said casing having a closed end journaled on a pivotal support above the support of said free rollers and having an open or receiving end adjacent to said brush, aligned elongated depressions formed in said dust pan, opposed tubular studs supported in said casing and extending toward each other and terminating adjacent to said arcuate depressions, spring loaded balls in said tubular studs resiliently engaging said depressions and allowing a predetermined limited movement of said dust pan up and down, whereby the latter may follow the surface variations of a floor or rug being traversed by said sweeper.

References Cited in the file of this patent

UNITED STATES PATENTS

| | | |
|---|---|---|
| 669,690 | Hardy | Mar. 12, 1901 |
| 688,189 | Mason | Dec. 3, 1901 |
| 909,366 | Chaplin | Jan. 12, 1909 |
| 991,908 | Stokes | May 9, 1911 |
| 2,587,038 | Goodell | Feb. 26, 1952 |

FOREIGN PATENTS

| | | |
|---|---|---|
| 635,413 | Great Britain | Apr. 12, 1950 |